United States Patent [19]

Shimizu

[11] Patent Number: 4,948,972
[45] Date of Patent: Aug. 14, 1990

[54] READ-OUT DEVICE FOR RADIATION IMAGE STORAGE PANEL

[75] Inventor: Hitoshi Shimizu, Minami-ashigara, Japan

[73] Assignee: Fuji Photo Film Co., Ltd., Kanagawa, Japan

[21] Appl. No.: 108,003

[22] Filed: Oct. 14, 1987

[30] Foreign Application Priority Data

Oct. 14, 1986 [JP] Japan ................. 61-243560

[51] Int. Cl.⁵ ................. G01N 23/04; G01N 21/89
[52] U.S. Cl. ................. 250/327.2; 250/484.1; 209/548
[58] Field of Search ............ 250/484.1, 327.2; 209/548, 577, 587

[56] References Cited

U.S. PATENT DOCUMENTS

| | | | |
|---|---|---|---|
| 2,731,621 | 1/1956 | Sontheimer | 209/587 |
| 3,023,900 | 3/1962 | Thier | 209/587 |
| 3,105,151 | 9/1963 | Nash | 209/587 |
| 3,355,014 | 11/1967 | Howles | 209/587 |
| 4,417,260 | 11/1983 | Kawai et al. | 250/327.2 |
| 4,437,571 | 3/1984 | Ohmura | 209/548 |
| 4,546,250 | 10/1985 | Horikawa et al. | 250/572 |

FOREIGN PATENT DOCUMENTS

| | | | |
|---|---|---|---|
| 0165641 | 8/1985 | Japan | 250/327.2 |
| 1393061 | 5/1975 | United Kingdom | 209/587 |

*Primary Examiner*—Janice A. Howell
*Assistant Examiner*—Richard Hanig
*Attorney, Agent, or Firm*—Sixbey, Friedman, Leedom & Ferguson

[57] ABSTRACT

A read-out device for a radiation image storage panel comprising a read-out means for photoelectrically reading out radiation image information recorded and stored in the panel containing a stimulable phosphor, a panel-conveying means for conveying the panel to the read-out means and a panel-receiving means for receiving the panel from the outside and conveying it to the panel-conveying means in a housing is disclosed. The read-out device is provided with a detecting means for detecting extraneous materials deposited on the surface of the panel to be fed to the panel-receiving means.

5 Claims, 2 Drawing Sheets

MOVEMENT OF PANEL

READ-OUT DEVICE FOR RADIATION IMAGE STORAGE PANEL

BACKGROUND OF THE INVENTION

1. Field of the invention

The present invention relates to a read-out device for use in performing a radiation image recording and reproducing method employing a radiation image storage panel having a stimulable phosphor.

2. Description of prior art

As a method for obtaining a radiation image, there has been conventionally employed a radiography utilizing a combination of a radiographic film having a sensitive silver salt material layer and an intensifying screen. As a method replacing the above-mentioned conventional radiography, a radiation image recording and reproducing method employing a stimulable phosphor as described, for instance, in Japanese Patent Provisional Publication No. 55(1980)-12145, has been developed and paid much attention. In this method, a radiation image storage panel (a stimulable phosphor sheet) having a stimulable phosphor is used and this method involves steps of causing the stimulable phosphor in the panel to absorb a radiation having passed through an object or having radiated from an object; exciting (or scanning) the phosphor with an electromagnetic wave such as visible light or infrared rays (i.e., stimulating rays) in time sequence to release radiation energy stored in the phosphor as light emission (i.e., stimulated emission); photoelectrically reading out the emitted light to obtain electric signals; and visualizing the electric signals as an image.

The radiation image storage panel used in the radiation image recording and reproducing method is sometimes called a stimulable phosphor sheet. Generally, the stimulable phosphor sheet comprises a support and a phosphor layer provided on one side thereof and is in the form of a sheet of rectangle, square, etc. (one side having a length of about 20 to 50 cm). Generally, a transparent protective film made of a plastic film is provided on the surface of the phosphor layer to protect the phosphor layer from chemical denaturation or physical shock.

The phosphor layer comprises a stimulable phosphor and a binder for retaining the phosphor in a dispersed form. The stimulable phosphor has such a property that when it is irradiated with a radiation such as X-rays, it is caused to absorb the radiation and then it emits light (stimulated emission) when excited with an electromagnetic wave such as visible light or infrared rays (i.e., stimulating rays). Thus, a radiation having passed through an object or having radiated from an object is absorbed by the phosphor layer of the panel in proportion to the amount of the radiation and a radiation image (radiation image information) of the object is formed as a radiation energy-stored image on the panel. When the panel is excited with an electromagnetic wave in time sequence, the radiation energy-stored image is released as stimulated emission. The stimulated emission is photoelectrically detected to obtain electric signals to reproduce the radiation energy-stored image of the object as a visible image.

In the radiation image recording and reproducing method, a radiation image is obtainable with a sufficient amount of information by applying a radiation to the object at a relatively small dose as compared with the conventional radiography. Accordingly, the radiation image recording and reproducing method is of great value, especially when the method is used for medical diagnosis by a radiography with X-rays.

Further, it has been found that the method can be advantageously used for the case where autoradiography is carried out in isolating and identifying high-molecular weight materials such as protein, nucleic acid, etc. originating from organisms and evaluating their characteristics.

In carrying out the radiation image recording and reproducing method employing the radiation image storage panel, there is conventionally used a system wherein a recording means for recording a radiation image on the panel, a read-out means for photoelectrically reading out the radiation image and an erasure means for erasing the remaining radiation image on the panel after read-out operation are separately provided or a device wherein the recording means, the read-out means and the erasure means are provided in a combination. Particularly, when the radiation image recording and reproducing method is performed by using a system wherein the recording means and the read-out means are separately provided, each panel is placed in a cassette (a light-shielding case) to prevent information on an image recorded and stored in the panel from being lost by exposure and lowering in the quality of a reproduced image from being caused thereby. The recording of the radiation image is made on the panel as placed in the cassette and the cassette is then fixed to the read-out means where the panel is taken out of the cassette and the read-out operation for the radiation image stored in the panel is conducted. Generally, the removal of the panel from the cassette is done by a cassette-removing means comprising a sucker provided within the system.

When the panel having the radiation image recorded and stored therein is exposed by allowing it to stand in a light room, the degree of loss of the radiation image is relatively low, when the exposure time is very short. However, when the panel is used for medical diagnosis, radiation image information is information on the human body (X-ray photograph of a region of the human body) and hence the image must be obtained with high accuracy.

In the radiation image information obtained by utilizing autoradiography, the image information is to be locational information (image information being recognized by a pattern) on the electrophoretically resolved pattern of radioactively labeled nucleic acid-cleavage products. Thus, not so much high resolution and accuracy are required for the image, as compared with the case for medical use. Therefore, it is not always necessary that the panel as placed in the cassette is fixed to the read-out means. It may be contemplated that the panel which is not placed in the cassette is fixed to the read-out means. In the case where the panel is not placed in any cassette, the means for taking the panel out of the cassette can be omitted, the system can be made compact and the manufacturing cost of the read-out means can be reduced.

SUMMARY OF THE INVENTION

It is an object of the present invention to provide a read-out device for a radiation image storage panel, which is provided with an auxiliary member for preventing a radiation image storage panel having extraneous materials deposited thereon from being introduced into the read-out means, when the panel which has radiation image information recorded and stored therein and is not placed in any cassette is introduced into the read-out means.

The present invention provides a read-out device for a radiation image storage panel, wherein a read-out means for photoelectrically reading out radiation image information recorded and stored in a radiation image storage panel containing a stimulable phosphor, a panel-conveying means for conveying the panel to the read-out means and a panel-receiving means for receiving the panel from the outside and conveying it to the panel-conveying means are placed in a housing, characterized in that there is provided a detecting means for detecting extraneous materials deposited on the surface of the panel to be fed to the panel-receiving means.

When the read-out device provided with a panel-feeding means according to the present invention is used, any extraneous materials can be detected and the radiation image storage panel having extraneous materials deposited thereon can be prevented from being introduced into the read-out device, when extraneous materials such as pieces of paper, electrophoretic membrane, resin sheets, etc. are deposited on the surface of the panel in introducing the panel having radiation image information recorded and stored therein, which is not placed in any cassette, into the read-out device.

Particularly, when the panel is employed in a system using radioisotope, for example, in recording an autoradiograph of an electrophoretically resolved pattern of the radioactively labeled cleavage products of a nucleic acid, there is a possibility that the panel on the surface of which pieces of paper, electrophoretic membrane and resin sheet containing radioisotope are deposited is fed to the read-out device. In such a case, the extraneous materials containing radioisotope can be detected by the extraneous material-detecting means of the present invention so that such extraneous materials can be prevented from being introduced into the read-out device, whereby the inside of the read-out device can be effectively prevented from being contaminated by a radiation.

The extraneous material-detecting means may be electrically connected to the panel feeding means and a signal for stopping the feed of the panel may be given to the panel-feeding means, when the extraneous materials are detected by the detecting means. In this way, the extraneous materials (undesired deposits) can be prevented easily and reliably from being introduced into the read-out device.

DETAILED DESCRIPTION OF THE INVENTION

The read-out device for the radiation image storage panel accoding to the present invention will be described in more detail below by referring to the accompanying drawings.

Figure 1:
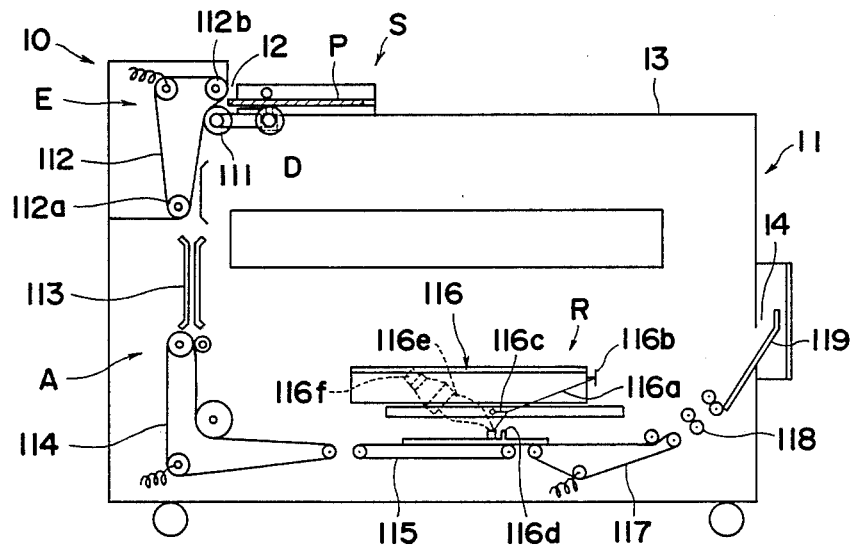
FIG. 1 is a schematic view showing an embodiment of the read-out device for a radiation image storage panel according to the present invention.

FIG. 1 is a schematic view illustrating the internal structure of the read-out device for the radiation image storage panel according to the present invention The function of the read-out section of the read-out device is known. Accordingly, the device will be briefly illustrated below to facilitate the understanding of the read-out device for the radiation image storage panel.

Referring to FIG. 1, the read-out device 10 is provided with a read-out means R for photoelectrically reading out radiation image information recorded and stored in the panel and a conveying means A for conveying the panel to the read-out means R. The read-out means R and the conveying means A are placed in a housing 11. Before the conveying means A, a panel-receiving means E for receiving the panel from the outside and conveying it to the panel-conveying means is provided at the upper part of the housing 11. There is provided a panel-feeding means S which adjoins the panel-receiving means E and is provided with an extraneous matter-detecting means D according to the present invention.

The radiation image storage panel P having radiation image information recorded thereon is fed to the read-out means through a panel-feeding part 12 provided at the upper part 13 of the housing 11. The panel P is introduced into the device while it is held between an inner driver roller 111 (which is an element of the panel-receiving means E) and an outer conveyor belt (endless conveyor belt) 112 for conveying the panel forward. The panel is then transferred to a guide member 113 which is approximately vertically provided.

The panel-receiving means E include a mechanism which conveys the panel while the panel P is bent to allow its traveling direction to be turned. This mechanism comprises an outer endless conveyor belt 112 (it is desirable that the panel is driven by this belt) supported by two rollers 112a and 112b positioned outside the housing and an inner roller 111 positioned inside the housing and interlocked with the conveyor belt 112. An inner endless conveyor belt may be used in place of the roller 111. However, it is desirable that the rotation of the roller 111 or the inner endless conveyor belt is made by a driven rotation which is caused by the movement of the outer endless conveyor belt in contact therewith through the panel P under pressure.

It is desirable that the revolution of the outer endless conveyor belt 112 is made on the axis of the roller 112a (or 112b) as a rotating shaft, is released from the opposing roller (or the inner endless conveyor belt) at the side of other roller 112b and opened outward to thereby release the interlocking. When such a structure is used, there is an advantage that the panel P is easily taken out, when the panel P is stopped or stays on the side of the panel-receiving means E.

The panel P is passed through the guide member 113 and then fed to a conveyor belt 114 arranged in a roughly right-angled form and provided at the lower corner of the device.

The panel is then transferred to a conveyor belt 115 which is positioned at the bottom of the device, arranged by starting from the end part of the belt 114 and is horizontally provided. Above the belt 115 is provided the read-out means R. The read-out means R is provided with a laser source 116. On the laser beam-guiding-out side of the laser source 116, there are provided a mirror 116b which reflects laser beam 116a to turn its direction, a galvanometer mirror 116c which reflects and deflects laser beam 116a to irradiate the panel with the laser beam (i.e., to carry out main scanning) and a condensing reflection mirror 116d for efficiently condensing stimulated emission emitted from the panel. Further, there is provided a condensing optical element 116e for condensing stimulated emission emitted from the panel against the condensing mirror 116d and along main scanning line at the scanning position of the laser beam 116a on the panel. At the top of the condensing optical element 116e is provided a photomultiplier 116f as a photoelectrical read-out means.

In the read-out means R, a radiation image (radiation image information) recorded on the panel P is read out. Namely, laser beam 116a is emitted from the laser source 116 and at the same time, the galvanometer mirror 116c is shaken whereby main scanning on the panel having a radiation image stored therein with laser beam 116a can be made. At the same time, the panel P is conveyed by a conveyor belt 115 so that it is moved forward. Thus, sub-scanning is made, whereby two-dimensional scanning can be conducted. Stimulated emission emitted from the panel by scanning the panel with laser beam 116a is reflected directly or by the condensing reflection mirror 116a, enters through the incident edge of the condensing optical element 116e into the element 116e, is guided under total reflection, reaches the photomultiplier 116f and is received thereby to photoelectrically read out the stimulated emission.

Image signals which have been photoelectrically read out are reproduced as a visible image on a display device such as CRT.

After the read-out operation has been completed, the panel P is passed through a conveyor belt 117 and pairs of rollers 118 and is discharged to a tray 119 which is provided in a panel discharge part 14 positioned on the side of the device.

The detecting means for detecting extraneous materials deposited on the surface of the radiation image storage panel according to the present invention will be described in more detail below by referring to FIGS. 2 to 5.

Usually, the detecting means for detecting undesired deposits on the surface of the panel is provided just before the panel-receiving means. The detecting means may be separately provided as an independent device However, it is desirable that the panel-feeding means for feeding the panel to the panel-receiving means is provided with the detecting means.

It is desirable that the panel-feeding means is such a device that driving force for feeding the panel is substantially given only by a roller or an endless belt in contact with one side of the panel under rotation.

The radiation image sotrage panel comprises a support and a stimulable phosphor layer provided on one side of the support as described above. Hence, the panel is flexible, but considerably rigid. Therefore, when the panel received by the panel receiving means E is bent during the course of movement while putting it between a driving belt and a driven roller (or a driven belt; the same applies hereinbelow) under pressure, the panel resists the movement and the panel is often stopped or stays. Particularly, when the angle of bend is a right angle or so, the panel highly resists bending pressure.

Accordingly, when the panel is forced to be introduced into the panel-receiving means E or its feed rate is too slow, a difference between the feed rate of the panel and the conveying speed in the panel-receiving means E becomes greater and the panel is liable to be stopped in the panel-receiving means. When the panel is manually fed to the panel receiving means, there is a problem that troubles are liable to be caused in the panel-receiving means.

Figure 2:
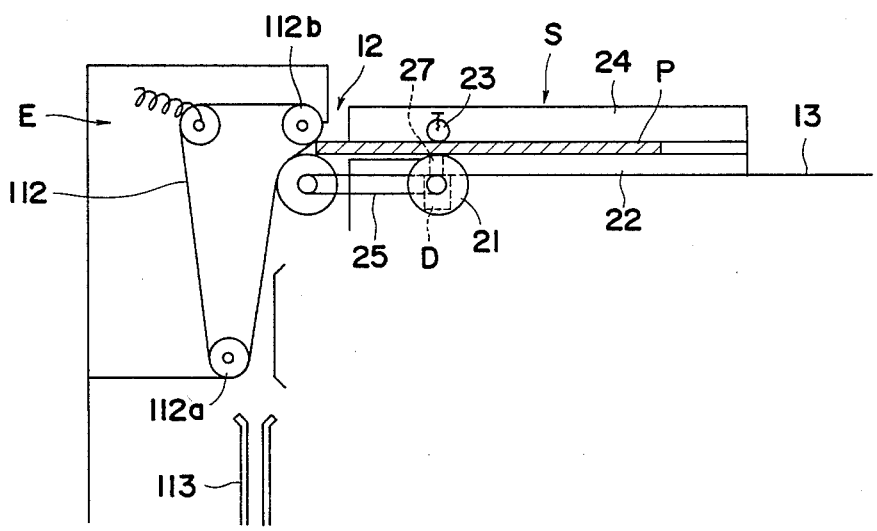
FIG. 2 is an enlarged view of a section showing the panel-feeding means S, the extraneous material-detecting means D and the panel-receiving means E of FIG. 1.
Figure 3:
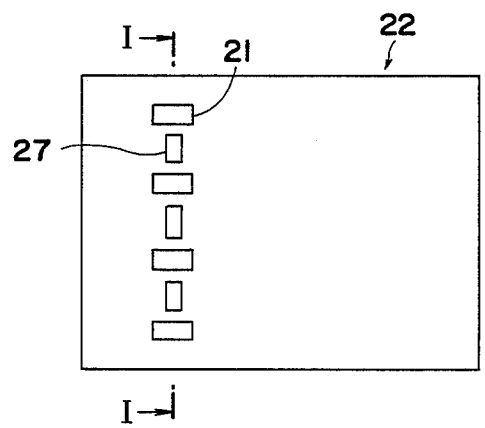
FIG. 3 is a plan view showing the panel-driving part of the panel-feeding means S of FIG. 2.

FIG. 2 is an enlarged view of a section showing the panel-feeding means S, the extraneous material-detecting means D and the panel-receiving means E of FIG. 1. FIG. 3 is a plan view showing the panel-driving part of the panel-feeding means S of FIG. 2.

There is shown an embodiment in which the panel-feeding means S comprises a panel-driving part 22 provided with a panel-driving roller 21 fixed to the upper part 13 of the housing and a lid part 24 provided with a driven roller 23 positioned opposite the panel-driving roller 21 and the lid part 24 is fixed to the panel-driving part in such a manner that it can be opened and closed. The panel-driving roller 21 may be composed of one roller, but it is desirable that it is composed of a plurality of rollers which function as a single roller as a whole, as shown in FIG. 3. The panel-driving roller may be connected directly to a driving source. Alternatively, it may be connected to any roller on the side of the panel-receiving means to obtain rotating energy from the panel receiving means, that is, to obtain driving energy for moving the panel forward.

Usually, the panel P is introduced into the panel-receiving means in such a manner that the phosphor layer side is positioned downward to facilitate the read-out operation in the read-out device and to prevent undesired exposure. Thus, it is desirable that the panel-feeding means is provided in such a manner that the panel contact driving part of the panel forward driving part thereof is positioned upward.

It is also desirable that the rotation of the driving roller 21 of the panel-feeding means S is synchronized with that of the driving roller 111 of the panel-receiving means E through a chain 25 so as to allow a panel-feeding speed from the panel-feeding means S to agree with a panel-receiving speed in the panel-receiving means E. In this way, the panel can be smoothly fed to the panel-receiving means E from the panel-feeding means S and the panel can be prevented from being damaged or the surface of the panel can be prevented from being marred.

Each of the panel-driving roller and the driven roller may be replaced by an endless belt. The driven roller (endless belt) for assisting the function of the panel-driving roller or endless belt may be optionally provided.

The panel-driving part is provided with one or more through-holes 27 so that a detection system (usually, a detection system utilizing light reflection being used) from the extraneous material-detecting means D is brought into contact with the surface of the panel through light.

Figure 4:
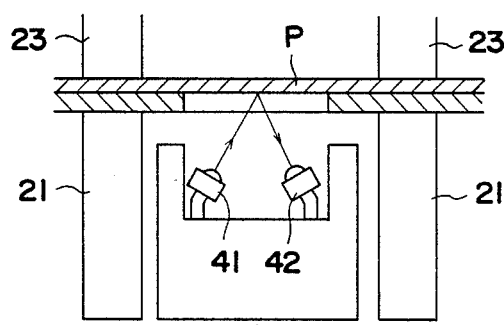
FIG. 4 is a partial cross-sectional view illustrating the relationship of the panel-feeding means S, the extraneous material-detecting means D and the panel P taken along the line I—I in FIG. 3.
Figure 5:
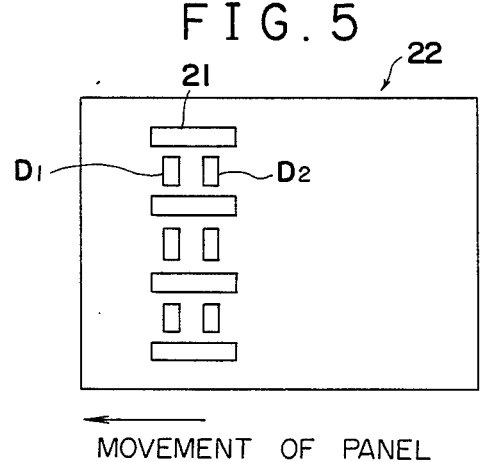
FIG. 5 is a view illustrating an embodiment of providing a plurality of detecting means which emit detecting light having different wavelength from each other.

FIGS. 4 and 5 are views illustrating embodiments of the constitution of the extraneous material-detecting means D.

FIG. 4 is a partial cross-sectional view illustrating the relationship of the panel-feeding means S, the extraneous material-detecting means D and the panel P taken along the line I—I in FIG. 3.

FIG. 4 shows a typical embodiment of the extraneous material-detecting means comprising a light-emitting part 41 and a light-receiving part 42. The surface of the radiation image storage panel is irradiated with light (an arrow) emitted from a light-emitting part 41 and the reflected light (an arrow) is detected by the light-receiving part 42 to detect light reflectance on the surface of the panel. Fluctuation in the reflectance between the panel surface and the surface of an extraneous material (e.g., pieces of paper, electrophoretic membrane or resin sheet) is caused, whereby the existence of the extraneous materials can be detected.

As light used in the case where the above-described light detection system is used, it is preferred to use infrared rays having a wavelength of not less than 800 nm (e.g., infrared rays having a wavelength of about 950 nm) emitted by using a semiconductor emission device as a light source. The stimulable phosphor contained in the radiation image storage panel is hardly sensitive to infrared rays within the wave range described above. Thus, when infrared rays are used as detecting light, the extraneous materials can be detected without giving an adverse effect to the radiation image recorded on the panel.

In the present invention, the extraneous material-detecting means are usually arranged in the form of a combination of a plurality of detectors in a row. Usually, a plurality of the detecting means (three detecting means in the embodiment shown in FIG. 3) are arranged in a row such that they are positioned in parallel with the panel surface and in the direction perpendicular to the traveling direction of the panel. If desired, a plurality of the rows of the detecting means may be arranged along the traveling direction of the panel. In this case, it is desirable that neighboring detecting means in the neighboring rows are arranged alternately (in a zigzag form) so that the detecting zones of the detecting means in the neighboring rows are not overlapped.

Further, it is desirable that the detecting means are provided at a position or in the vicinity of a position where the panel is hardly moved up and down.

FIG. 5 shows an embodiment wherein there are provided a plurality of detecting means $D_1$ and $D_2$ which emit a detecting light having different wavelengths from each other (FIG. 5 shows the case where two detecting means are provided.

The detecting means of FIG. 5 comprises at least two detecting means $D_1$ and $d_2$, each of the devices $D_1$ and $D_2$ having a light-emitting part and light-receiving part as shown in FIG. 4. The surface of the radiation image storage panel is irradiated with light emitted from each light-emitting part and each of the reflected light is detected by the light-receiving part to detect light reflectance on the surface of the panel P. Variation (or difference) of the reflectance between the panel surface and the surface of an extraneous material is caused, whereby the existence of the extraneous materials can be detected. In the detecting system of FIG. 5, light emitted from the light-emitting part of the device $D_1$, must have a different wavelength from that of light emitted from the light-emitting part of the device $D_2$.

The number of the kinds of the extraneous materials and the state thereof vary depending on the cases where the panel is used. For example, various kinds of the extraneous materials such as paper, electrophoretic membranes and resin sheets are sometimes deposited on the surface of the panel, or even when only one kind of the extraneous material is deposited, there is a possibility that it is deposited thereon in different states (e.g., in a dry state and in a wet state). In these cases, there often arises difficulty in detecting the extraneous material or materials, when only one kind of light having a wavelength is used. For this reason, it is desirable that there are used at least two light-emitting parts wherein light emitted from one light-emitting part has a different wavelength from that of light emitted from the other light-emitting part, while taking the number of the kinds of the extraneous materials into consideration. For example, there are used two semiconductor emission devices wherein one light emitting part emits light having a wavelength of 600 nm (red) and the other emits light having a wavelength of 500 nm (orange). However, when light emitted has a wavelength of not more than 800 nm, it is desirable that the amount of light is kept at a low level so as not to cause the deterioration of the radiation image recorded on the panel.

In the above embodiment, the extraneous material-detecting means is fixed to the housing. The extraneous material-detecting means may be separately provided and when necessary, it may be fixed to the housing.

While there has been described the read-out means provided with only the read-out means as a functioning means, the read-out means for the radiation image storage panel according to the present invention may be optionally provided with other means such as an erasure means for releasing and erasing radiation image which is left in the panel even after the completion of the read-out operation.

I claim:

1. A read-out device for a radiation image storage panel containing a stimulable phosphor, wherein said device includes a housing containing a read-out means for photoelectrically reading out radiation image information recorded and stored in said stimulable phosphor-containing panel, a panel receiving means for receiving the panel and directing said panel into the housing to panel conveying means for conveying the panel to the read-out means within said housing, wherein said device further includes a plurality of extraneous material detecting means located exteriorly of said housing for detecting the existence of undesirable extraneous material on said panel surface, each of said extraneous material detecting means comprising a light-emitting portion which irradiates said panel surface with infrared rays having a wavelength that will not adversely effect the radiation image on said stimulable phosphor and a light-receiving portion, which detects light reflectance from the surface of said panel, and wherein said read-out device further includes a panel-feeding means and said detecting means produces a signal for stopping the panel-feeding means from feeding said panel to said panel receiving means in the event comparison of the irradiating and reflected light detects the presence of extraneous material.

2. The read-out device for a radiation image storage panel as claimed in claim 1, wherein each of said plurality of detecting means comprises a light-emitting portion and a light-receiving portion and the extraneous materials deposited on the surface of the panel are detected by irradiating the surface of the panel with light emitted from the light-emitting portion, and light reflected by the extraneous materials and light reflected by the surface of the panel are detected by the light-receiving portion, and the difference between the former light and the latter light is compared to detect the existence of the extraneous materials.

3. The read-out device for a radiation image storage device as claimed in claim 2, wherein said light-emitting portion emits infrared rays having a wavelength of not less than 800 nm.

4. The read-out device for a radiation image storage panel as claimed in claim 1, wherein said panel-feeding means is located exteriorly of said housing for feeding the panel to the panel-receiving means, said panel-feeding means including a roller or an endless belt under rotation arranged to contact the surface of the panel opposite the detecting means.

5. The read-out device for a radiation image storage panel as claimed in claim 2, wherein said device includes two of said detecting means.

* * * * *